United States Patent [19]

Åbom

[11] Patent Number: 5,706,768
[45] Date of Patent: Jan. 13, 1998

[54] ZIGZAG IGNITION GAP ARRANGEMENT

[75] Inventor: Jan Åbom, Poppelgatan 12, S-421 74 Västra Frölunda, Sweden

[73] Assignees: Jan Åbom, Västra Frölunda; Bengt G. Törnqvist, Stockholm, both of Sweden; a part interest

[21] Appl. No.: 513,975
[22] PCT Filed: Mar. 15, 1994
[86] PCT No.: PCT/SE94/00226
§ 371 Date: Apr. 4, 1996
§ 102(e) Date: Apr. 4, 1996
[87] PCT Pub. No.: WO94/21903
PCT Pub. Date: Sep. 29, 1994

[30] Foreign Application Priority Data

Mar. 15, 1993 [SE] Sweden ............... 9300845

[51] Int. Cl.⁶ ............................................. F02R 45/00
[52] U.S. Cl. ................................................... 123/23
[58] Field of Search ................... 123/23; 60/39.464; 110/104 R, 104 B; 431/264, 265, 266

[56] References Cited

U.S. PATENT DOCUMENTS

| 4,610,136 | 9/1986 | Åbom ............... 60/39.464 |
| 4,738,227 | 4/1988 | Kamo et al. ............... 123/23 |
| 5,202,303 | 4/1993 | Retallick et al. ............... 431/7 |

FOREIGN PATENT DOCUMENTS

| 20260908 | 3/1988 | European Pat. Off. . |
| B42725 | 2/1983 | Sweden . |

Primary Examiner—Noah P. Kamen
Attorney, Agent, or Firm—Christie, Parker & Hale, LLP

[57] ABSTRACT

The invention relates to an arrangement in such ignition gaps or channels as are used in combustion devices, for example, internal combustion engines, to impart to an injected finely-divided particulate fuel a temperature sufficient for ignition, heat being transferred from the heated walls for the ignition gaps or channels. The novelty of the invention resides in that the ignition gap or gaps are zigzag-shaped or otherwise formed of two or more substantially straight sections connected at an angle to each other.

9 Claims, 6 Drawing Sheets

ZIGZAG IGNITION GAP ARRANGEMENT

FIELD OF THE INVENTION

This invention relates to ignition gaps typically used in internal-combustion engines to impart to an injected fuel, preferably in the form of a powder, a temperature sufficient for ignition.

BACKGROUND OF THE INVENTION

Swedish Patent Specification 8202835-8 describes an ignition gap device for diesel engines, where wood powder is supplied into the ignition gaps and caused to impinge on the heated gap walls for progressive ignition.

The major problem in the operation of these type of internal-combustion engines employing solid powder fuels is the ignition delay. In diesel engines, the ignition delay is defined as the time elapsing from the moment the fuel is injected into the combustion chamber until it is ignited.

SUMMARY OF THE INVENTION

Accordingly, an object of the present invention is to provide a controlled reduction of the ignition delay and to increase the efficiency of fuel ignition. These and other objects are accomplished by arranging the ignition gaps in a zigzag configuration. Preferably, the ignition gaps are provided in different lengths by using a modular technique that can be adapted to prevailing requirements.

BRIEF DESCRIPTION OF THE DRAWINGS

Preferred embodiments of the arrangement according to the invention will be described in more detail hereinbelow with reference to the accompanying drawings, wherein.

DETAILED DESCRIPTION

Figure 1:
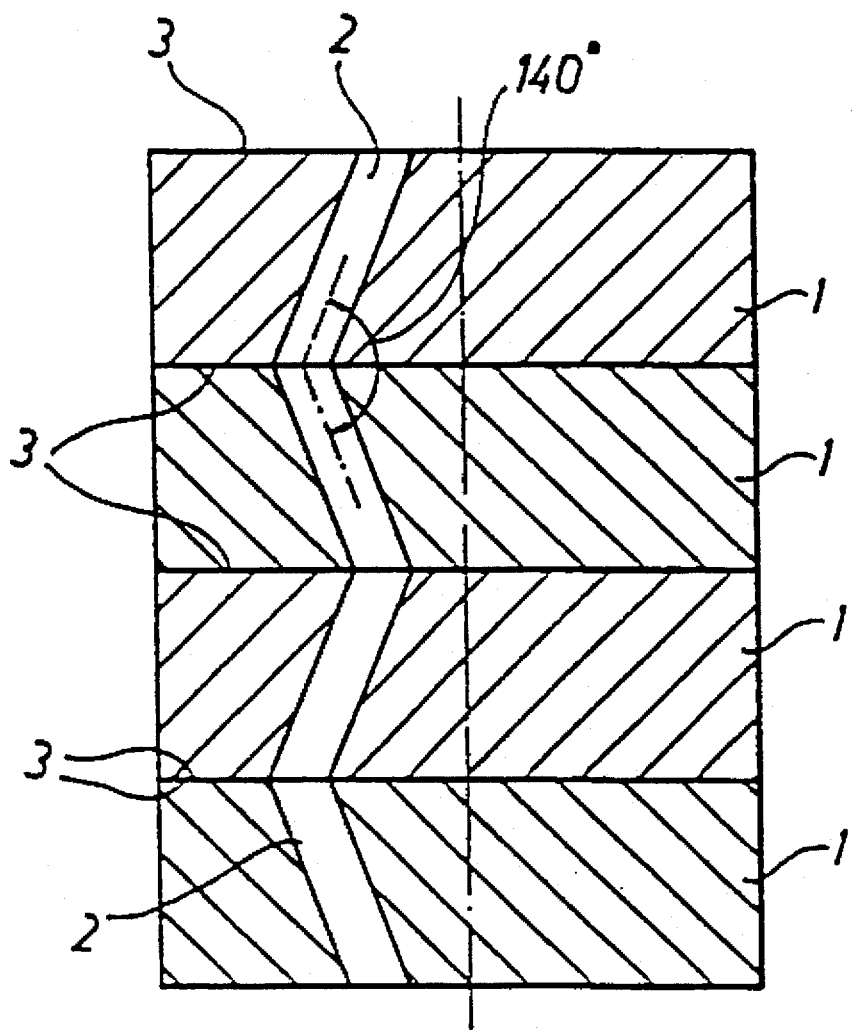
FIG. 1 is a schematic partial cross section showing the possible design of an ignition gap section.

FIG. 1 schematically illustrates a preferred embodiment of the present invention. A zigzag-shaped path created by ignition gaps or channels 2 is formed from several plates or modules 1. Each plate 1 is formed with one or more channel or gap sections having one of two different directions. The plates 1 are alternately stacked such that adjacent plates 1 have channel or gap sections with different directions. The inlets and outlets of adjacent plates 1 are located at the same position to form the one or more zigzag-shaped gaps or channels. In the embodiment of FIG. 1, the mutual directional deviation of the ignition gap or channel 2 in the plates 1 is about 140°.

The plates or modules are preferably made of ceramics. The end surfaces 3 are accurately ground and lapped to provide a leakproof seal between adjacent plates 1 without the need of additional sealing devices.

Figure 2:
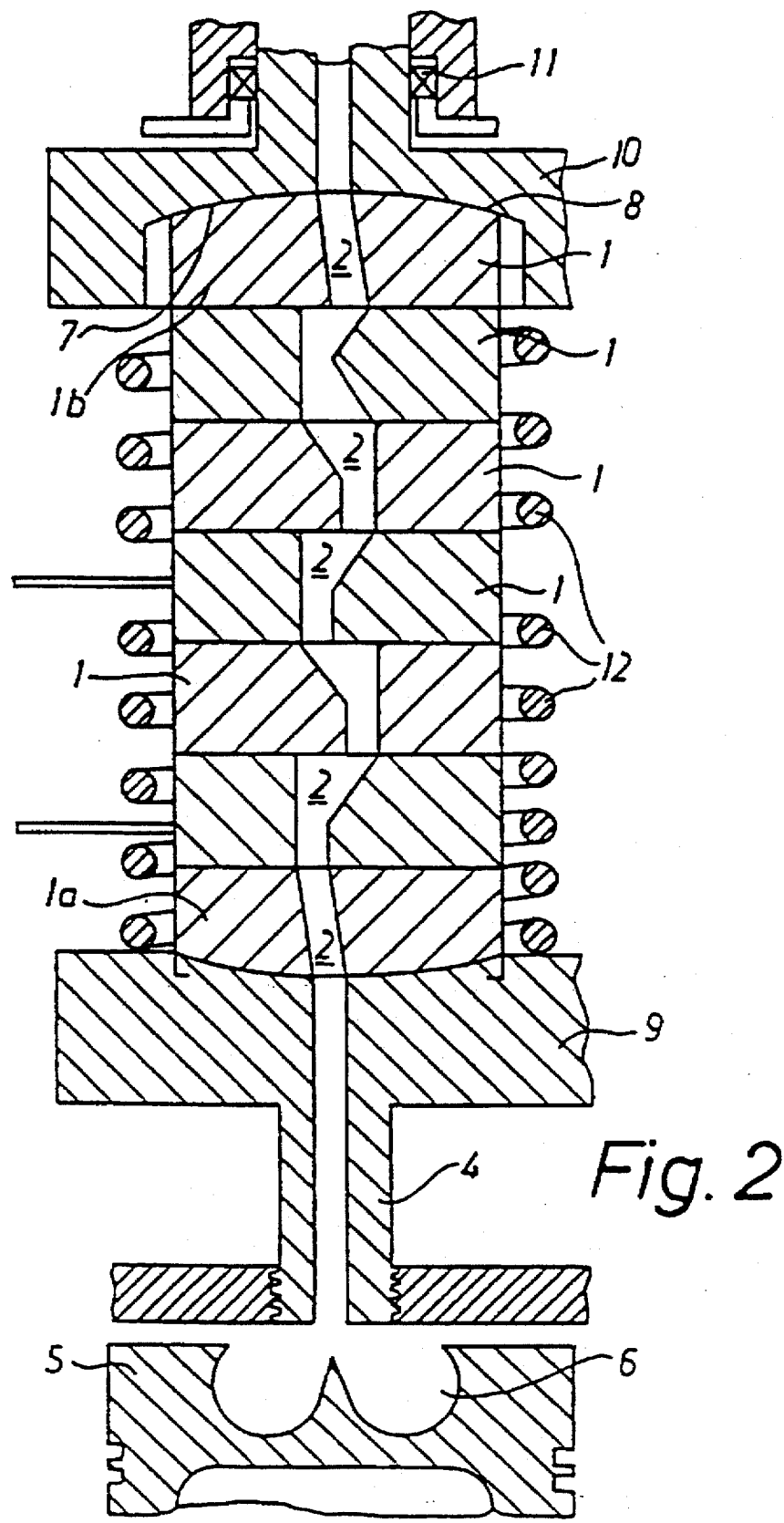
FIG. 2 is a schematic cross section showing the design of a slightly modified ignition gap device.

FIG. 2 shows an arrangement of plates 1 adjacent an injection nozzle 4. The injection nozzle 4 is positioned over a piston 5 in the combustion chamber 6 of a diesel engine. In this embodiment, the end plates 1a and 1b have spherically domed surfaces 7 accurately mating with complementary dome shaped surfaces 8 of parts 9 and 10, respectively. Parts 9 and 10 are fixed to the engine and arranged at the injection mechanism. Part 10 is provided with a movable gland seal 11 taking up the temperature movement in the plates. The spherical end plates, 1a and 1b, facilitate mounting. The plates 1 are heated during the starting phase by a heating coil or winding 12.

For clarifying purposes, a description of the preferred powder fuel will now be given. In the manufacture of powder fuel for internal combustion engines, the fuel is ground and sifted. The fuel may be grounded using beater mills, ball mills, cylpebs mills or pinned disc mills, as well as vacuum mills. Sifting takes place in wind sifters designed as a centrifugal fan. A gas laden with powder is caused to flow through the fan from the periphery towards the center. The result being that only very small particles pass the wind sifter. By varying the flow through the fan and its speed of rotation, it is possible to obtain a very fine powder.

Figure 3:
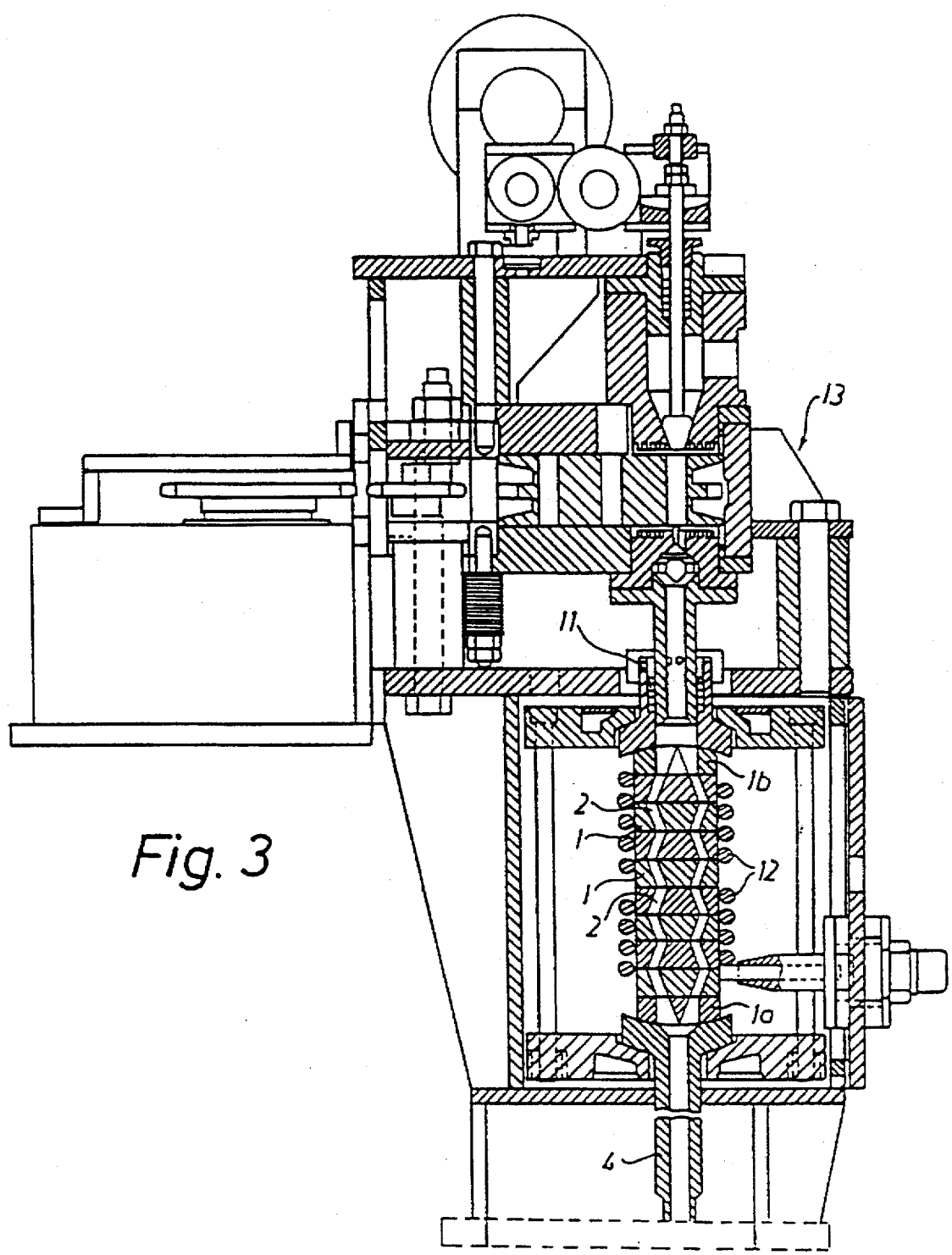
FIG. 3 is a general view, partly in section, showing how the ignition gap device is integrated in an injection mechanism.

FIG. 3 is a general view partly in section showing how the arrangement according to the invention is integrated in an injection mechanism.

In this embodiment, the fitted plates are designated as 1, and those having spherical end surfaces 7 are designated as 1a and 1b, respectively. The injection nozzle is designated as 4, and the injection mechanism feeding and portioning the fuel is designated as 13. The heating coil is designated as 12. Other components in this figure are illustrated for clarifying purposes only.

As will be appreciated, it is vital that the plates 1 be joined together in the most accurate manner.

In order for the ignition gaps to function properly, the temperature must be at least 900° C. The engine operates with minimal emissions when the temperature is 1100° C. Since metallic materials do not withstand such high temperatures, ceramics must be used.

For working ceramics, diamond tools, such as silicon nitride and aluminum oxide, are required. The most economical way of producing ceramics is by compression-molding and then sintering at high temperatures. In one approach, the compression-molded powder is presintered and then turned and drilled before the final sintering takes place. In the diesel engine described above, the zigzag-shaped ignition gap is formed with ten plates 1 having straight channel sections with 140° bends between adjacent sections. The ignition gap diameter is preferably 6 mm. The zigzag-shaped ignition gap is obtained from a number of round plates having angled holes. As mentioned above, the plates have been ground and lapped to minimize leakage when pressed together.

Figure 4:
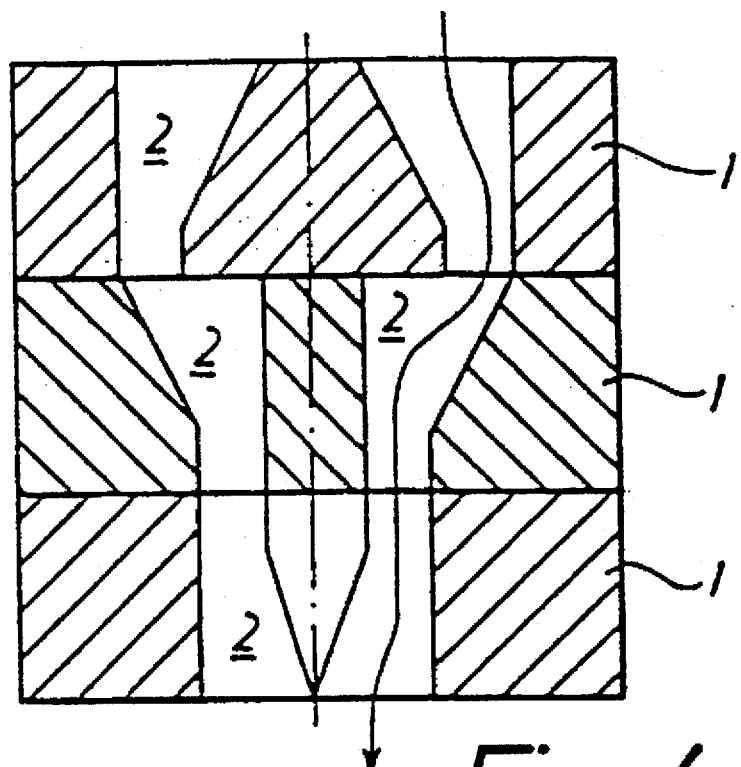
FIG. 4 is a cross section showing how three ignition gap plates of different hole configurations are joined together to extend in zigzag-shaped ignition gaps.
Figure 5:
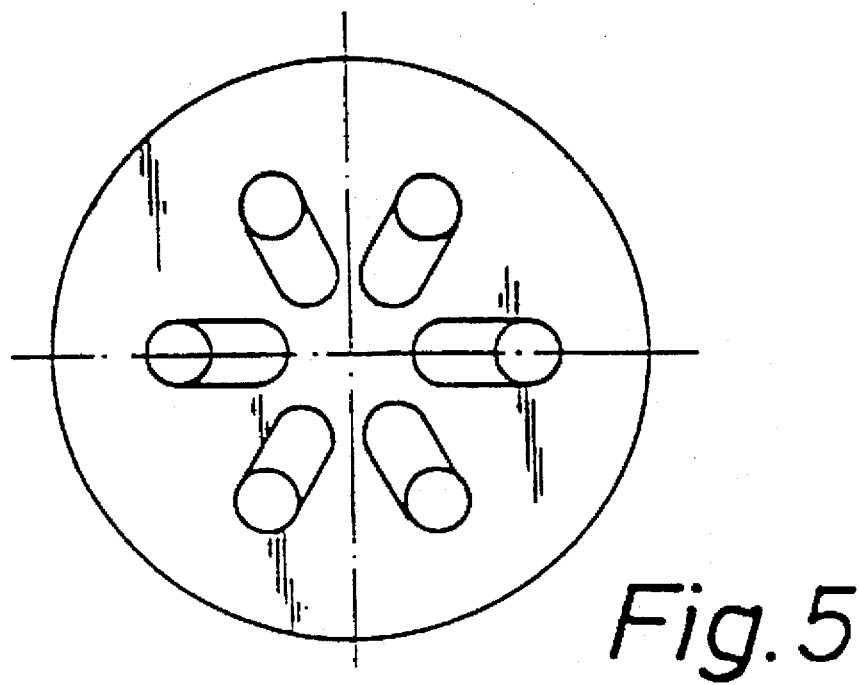
FIG. 5 is an end view of the upper plate in FIG. 4.
Figure 9:
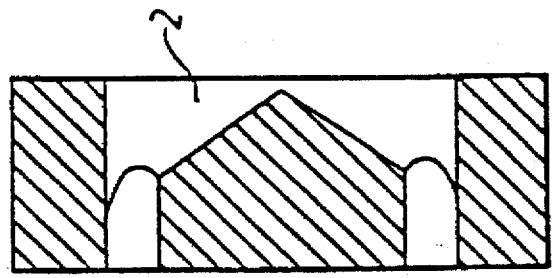
FIGS. 7, 8, and 9 are cross sections of the plate in FIG. 6, taken along the lines AA, BB and CC, respectively.
Figure 6:
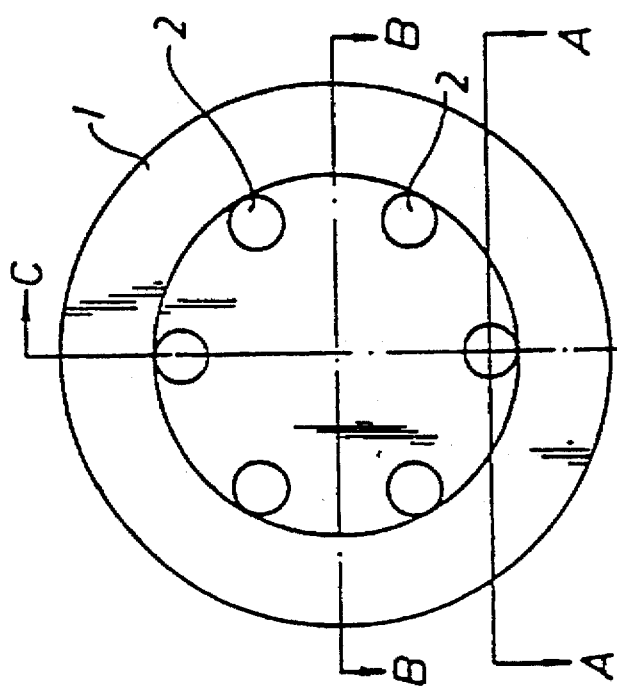
FIG. 6 is an end view of another plate embodiment.
Figure 7:
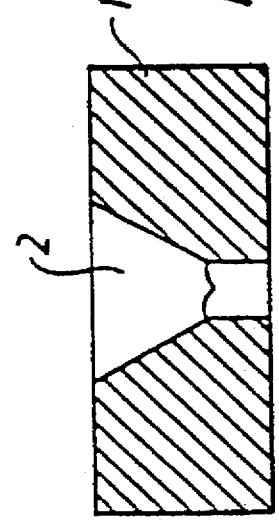
Figure 8:
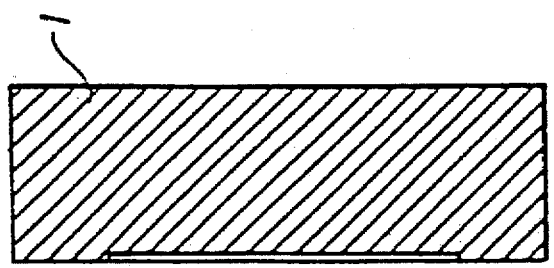

FIGS. 4 and 5 show a modified design of the plates 1. The shape of the channel or gap sections vary in the different plates. This embodiment, like the others, can be compressed to its final shape before sintering, with the only remaining operation being grinding and lapping.

FIGS. 6, 7, 8, and 9 show yet another plate design which can also be compressed to its final shape before sintering and subsequent grinding and lapping. In this embodiment, a different channel or gap shape is obtainable.

Figure 10:
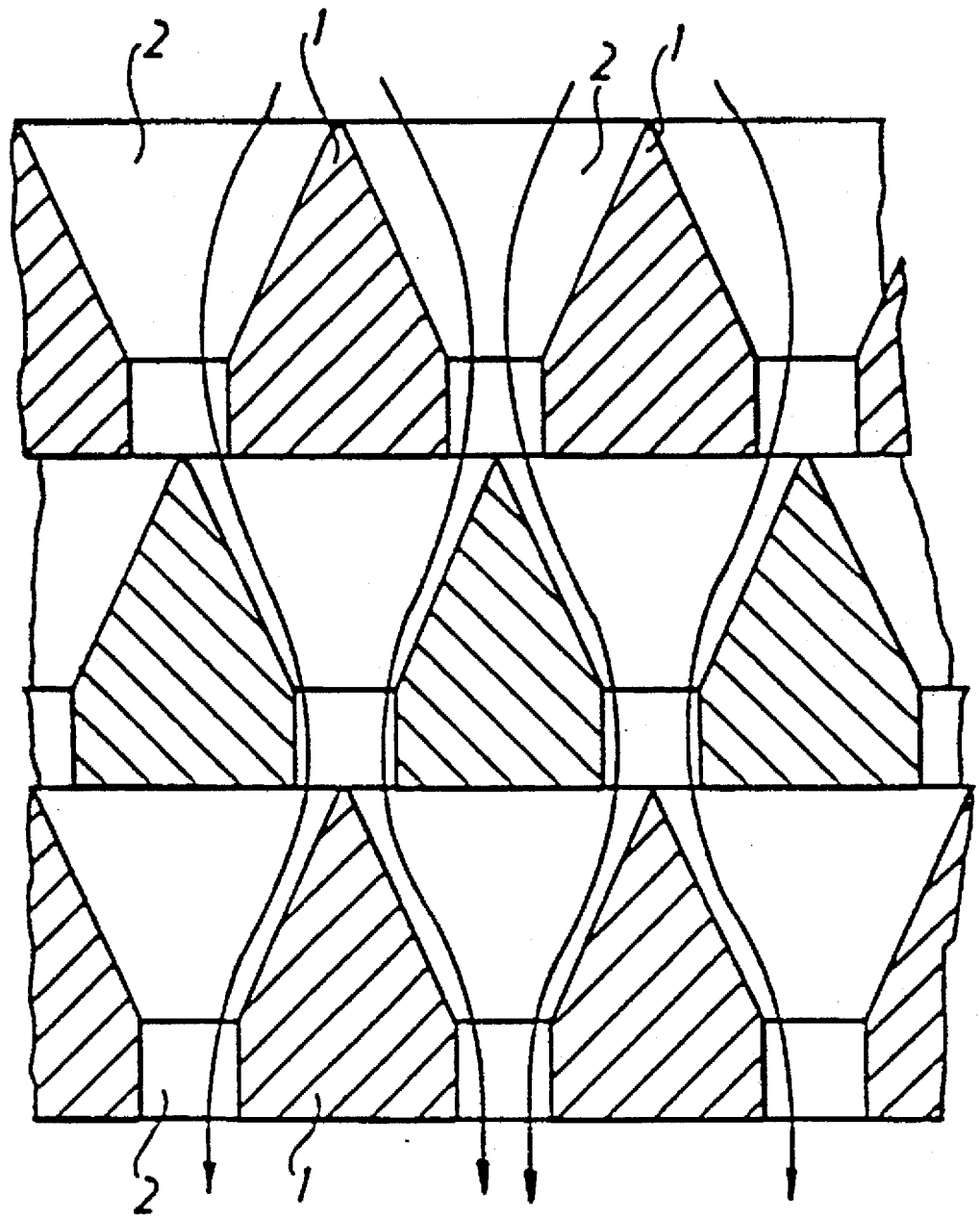
FIG. 10 is an extended view taken along the radius r in FIG. 9 through three plates arranged as in FIG. 4.

FIG. 10 is an extended schematic view showing how the transport paths for the fuel are formed and how they are given a pronounced zigzag configuration. As shown in FIG. 1♦, the fuel particles are forced to repeatedly impinge on the gap or channel walls. These walls are maintained at a high temperature which results in the ignition of the fuel when injected into the combustion chamber.

Zigzag-shaped ignition gaps according to the invention can be used for igniting all pulverulent fuels made from wood, straw, grass, bagasse, peat, coal and brown coal for firing furnaces, internal-combustion engines, both Otto and diesel engines, as well as gas turbines. The fuel which is undoubtedly the best is Eucalyptus Teriticornis because of its extremely low ash content. Depending on its habitat, this tree species has less than 0.03% ash based on the dry weight of the wood.

Practical tests have shown that if the fuel particles are smaller than 16 μm with a normal distribution around 8 μm and the solid fuel consists of wood powder that has been hydrolyzed (with the aid of superheated formic acid steam at 200° C. for 2 hours at atmospheric pressure), the ignition delay becomes only 15° at a speed of 3600 rpm if zigzag-shaped gaps or channels having a length of about 200 mm and a diameter of 6 mm are used. The reason why a zigzag-shaped channel or gap is more efficient than a conical one is that the larger particles will impinge on the hot walls a considerable number of times when passing through the ignition gap compared with an expanding gap as described in Swedish Patent No. 8202835-8.

What is claimed is:

1. An ignition gap arrangement for combustion devices, comprising a wall structure having a zigzag shaped channel formed therein for imparting to an injected finely-divided particulate fuel passing through said channel a temperature sufficient for ignition, said wall structure comprising a plurality of plates having substantially inclined through openings and arranged so that the ends of the openings of adjacent plates correspond with each other, the openings of adjacent plates having deviating directions.

2. The ignition gap arrangement of claim 1 wherein each of the openings has an angular inclination of approximately 20° with respect to a normal axis passing through the plane of the respective plate.

3. The ignition gap arrangement of claim 2 wherein each of the plates has a thickness of approximately 20 mm.

4. The ignition gap arrangement of claim 1, 2 or 3 wherein abutting surfaces of adjacent plates are ground and lapped.

5. The ignition gap arrangement of claim 4 wherein each of the plates comprises a ceramic material.

6. The ignition gap arrangement of claim 1 or 3 wherein each of two plates positioned at opposite ends of said wall structure has a spherically-domed smoothed end surface.

7. The ignition gap arrangement of claim 6 further comprising compression means, adapted to engage each spherically-domed smoothed end surface of the two end plates, for compressing the plates, said compression means comprising a gland sealing device, against which the plurality of plates is applied, and means for cooling said plates.

8. The ignition gap arrangement of claim 7, wherein said compression means further comprises at least one flange device acting on one end of the plates and operable by an external pressure to hold the plates compressed.

9. The ignition gap arrangement of claim 1, 2 or 3 wherein each of the plates is comprised of a material adapted to withstand a temperature of approximately 1250° C. and an internal pulsating pressure in the range of approximately 1–200 bar.

* * * * *